(12) United States Patent  (10) Patent No.: US 9,404,405 B2
Nakamura et al.  (45) Date of Patent: Aug. 2, 2016

(54) ABNORMALITY DIAGNOSIS APPARATUS FOR EXHAUST GAS PURIFICATION APPARATUS

(71) Applicants: TOYOTA JIDOSHA KABUSHIKI KAISHA, Toyota-shi, Aichi-ken (JP); KABUSHIKI KAISHA TOYOTA JIDOSHOKKI, Kariya-shi, Aichi-ken (JP)

(72) Inventors: Yoshitaka Nakamura, Nagoya (JP); Satoshi Endo, Kariya (JP)

(73) Assignees: Toyota Jidosha Kabushiki Kaisha, Toyota-shi, Aichi-ken (JP); Kabushiki Kaisha Toyota Jidoshokki, Kariya-shi, Aichi-ken (JP)

( * ) Notice: Subject to any disclaimer, the term of this patent is extended or adjusted under 35 U.S.C. 154(b) by 0 days.

(21) Appl. No.: 14/718,374

(22) Filed: May 21, 2015

(65) Prior Publication Data

US 2015/0337707 A1   Nov. 26, 2015

(30) Foreign Application Priority Data

May 23, 2014   (JP) ................................. 2014-107402

(51) Int. Cl.
*F01N 3/00* (2006.01)
*F01N 3/08* (2006.01)
(Continued)

(52) U.S. Cl.
CPC ............ *F01N 3/0842* (2013.01); *F01N 3/0828* (2013.01); *F01N 3/208* (2013.01);
(Continued)

(58) Field of Classification Search
USPC ................... 60/277, 286, 295, 297, 301, 303
See application file for complete search history.

(56) References Cited

U.S. PATENT DOCUMENTS

| 7,418,957 B2 * | 9/2008 | Abe ..................... F02D 41/1494 123/697 |
| 7,997,070 B2 * | 8/2011 | Yasui ...................... F01N 3/206 60/276 |

(Continued)

FOREIGN PATENT DOCUMENTS

| JP | 7-26943 | 1/1995 |
| JP | 2009-19520 | 1/2009 |

(Continued)

*Primary Examiner* — Binh Q Tran
(74) *Attorney, Agent, or Firm* — Finnegan, Henderson, Farabow, Garrett & Dunner, LLP

(57) ABSTRACT

The present invention provides an abnormality diagnosis apparatus for an exhaust gas purification apparatus having an SCR catalyst, with which a misdiagnosis of an abnormality in the SCR catalyst even though the SCR catalyst is normal can be suppressed. In the present invention, a $NO_x$ purification ratio is determined using an estimated $NO_x$ inflow amount as a parameter, and an abnormality in the SCR catalyst is diagnosed on the basis of the $NO_x$ purification ratio. According to the present invention, a minimum $NH_3$ adsorption amount is determined as an $NH_3$ adsorption amount of the SCR catalyst in a condition where an actual $NO_x$ inflow amount reaches a maximum. When the minimum $NH_3$ adsorption amount equals or exceeds a predetermined amount, a determination is made as to whether or not a $NO_x$ purification ability of the SCR catalyst has deteriorated from a normal condition by comparing the $NO_x$ purification ratio with a first threshold. When the minimum $NH_3$ adsorption amount is smaller than the predetermined amount, a determination is made as to whether or not the $NO_x$ purification ability of the SCR catalyst has been completely lost by comparing the $NO_x$ purification ratio with a second threshold that is smaller than the first threshold.

4 Claims, 10 Drawing Sheets

(51) Int. Cl.
  *F01N 3/20* (2006.01)
  *F01N 9/00* (2006.01)
  *F01N 11/00* (2006.01)
  *F01N 13/00* (2010.01)

(52) U.S. Cl.
  CPC .............. *F01N 3/2066* (2013.01); *F01N 9/00* (2013.01); *F01N 11/00* (2013.01); *F01N 13/009* (2014.06); *F01N 2550/00* (2013.01); *F01N 2550/02* (2013.01); *F01N 2550/05* (2013.01); *F01N 2560/026* (2013.01); *F01N 2560/06* (2013.01); *F01N 2560/07* (2013.01); *F01N 2570/18* (2013.01); *F01N 2610/02* (2013.01); *F01N 2610/146* (2013.01); *F01N 2900/0601* (2013.01); *F01N 2900/08* (2013.01); *F01N 2900/1402* (2013.01); *F01N 2900/1602* (2013.01); *F01N 2900/1616* (2013.01); *F01N 2900/1621* (2013.01); *F01N 2900/1622* (2013.01); *Y02T 10/24* (2013.01); *Y02T 10/47* (2013.01)

(56) References Cited

U.S. PATENT DOCUMENTS

| 8,171,723 | B2* | 5/2012 | Hagimoto | F01N 3/2066 60/277 |
| 8,281,572 | B2* | 10/2012 | Chi | F01N 3/106 60/274 |
| 8,418,438 | B2* | 4/2013 | Shimomura | F01N 3/208 60/277 |
| 8,453,434 | B2* | 6/2013 | Yacoub | F01N 3/208 60/274 |

FOREIGN PATENT DOCUMENTS

| JP | 2012-36857 | 2/2012 |
| JP | 2012-255397 | 12/2012 |
| JP | 2013-36345 | 2/2013 |
| JP | 2013-181453 | 9/2013 |

* cited by examiner

ABNORMALITY DIAGNOSIS APPARATUS FOR EXHAUST GAS PURIFICATION APPARATUS

BACKGROUND OF THE INVENTION

1. Field of the Invention

The present invention relates to a technique for diagnosing an abnormality in a selective catalytic redaction catalyst (an SCR catalyst) disposed in an exhaust passage of an internal combustion engine.

2. Description of the Related Art

A conventional exhaust gas purification apparatus of an internal combustion engine includes an SCR catalyst and an addition device that adds an additive constituted by ammonia ($NH_3$) or an $NH_3$ precursor to exhaust gas flowing into the SCR catalyst. In a conventional technique for detecting an abnormality in this type of exhaust gas purification apparatus, an abnormality in the exhaust gas purification apparatus is diagnosed using an amount of $NO_x$ (referred to hereafter as a "$NO_x$ inflow amount") flowing into the SCR catalyst as a parameter. For example, a method of calculating a $NO_x$ purification ratio (a ratio of an amount of $NO_x$ purified by the SCR catalyst to the $NO_x$ inflow amount) of the SCR catalyst using the $NO_x$ inflow amount as a parameter, and diagnosing an abnormality in the exhaust gas purification apparatus on the basis of the calculation result may be used (see Patent Literature 1, for example).

PRIOR ART DOCUMENTS

Patent Literature 1: Japanese Patent Application Publication No. 2012-36857
Patent Literature 2: Japanese Patent Application Publication No. 2013-181453
Patent Literature 3: Japanese Patent Application Publication No. 2013-036345
Patent Literature 4: Japanese Patent Application Publication No. 2012-255397
Patent Literature 5: Japanese Patent Application Publication No. 2009-019520
Patent Literature 6: Japanese Patent Application Publication No. H07-026943

SUMMARY OF THE INVENTION

In an abnormality diagnosis method for an exhaust gas purification apparatus such as that described above, an estimated value of the $NO_x$ inflow amount may be used. At this time, the $NO_x$ inflow amount is estimated using parameters denoting operating conditions of the internal combustion engine, such as an intake air amount, a fuel injection amount, a fuel injection timing, and an engine rotation speed.

Incidentally, an amount of $NO_x$ (referred to hereafter as an "actual $NO_x$ inflow amount") actually flowing into the exhaust gas purification apparatus may vary due to factors other than the parameters described above. For example, an amount of $NO_x$ generated when an air-fuel mixture is burned tends to increase steadily together with reductions in humidity, and therefore the actual $NO_x$ inflow amount increases steadily as the humidity decreases.

When the actual $NO_x$ inflow amount varies due to a factor other than the operating conditions of the internal combustion engine, a deviation between the estimated value of the $NO_x$ inflow amount (referred to hereafter as an "estimated $NO_x$ inflow amount") and the actual $NO_x$ inflow amount increases. The deviation between the estimated $NO_x$ inflow amount and the actual $NO_x$ inflow amount also increases when a measurement error of an air flow meter used to measure the intake air amount is large.

When the deviation between the estimated $NO_x$ inflow amount and the actual $NO_x$ inflow amount is large, and an abnormality diagnosis is performed on the exhaust purification apparatus using the estimated $NO_x$ inflow amount as a parameter, a misdiagnosis may occur. In particular, when the estimated $NO_x$ inflow amount falls below the actual $NO_x$ inflow amount due to a reduction in humidity or a measurement error in the air flow meter, the $NO_x$ purification ratio calculated using the estimated $NO_x$ inflow amount as a parameter falls short of the actual $NO_x$ purification ratio, and as a result, an abnormality may be misdiagnosed in the SCR catalyst even though the SCR catalyst is normal.

The present invention has been designed in consideration of the circumstances described above, and an object thereof is to provide an abnormality diagnosis apparatus for an exhaust gas purification apparatus, which is configured to diagnose an abnormality in an exhaust gas purification apparatus having an SCR catalyst using an estimated $NO_x$ inflow amount as a parameter, and with which a misdiagnosis of an abnormality in the SCR catalyst even though the SCR catalyst is normal when the estimated $NO_x$ inflow amount falls short of an actual $NO_x$ inflow amount can be suppressed.

The present invention provides an abnormality diagnosis apparatus for an exhaust gas purification apparatus, which is configured to diagnose an abnormality in an exhaust gas purification apparatus having an SCR catalyst using an estimated $NO_x$ inflow amount as a parameter. The abnormality diagnosis apparatus determines a minimum $NH_3$ adsorption amount, which is an $NH_3$ adsorption amount of the SCR catalyst obtained in a case where a $NO_x$ inflow amount reaches a maximum due to a factor other than an operating condition of an internal combustion engine, and modifies a diagnosis mode in accordance with the minimum $NH_3$ adsorption amount.

More specifically, an abnormality diagnosis apparatus for an exhaust gas purification apparatus according to the present invention includes:

an exhaust gas purification apparatus disposed in an exhaust passage of an internal combustion engine and having a selective catalytic reduction catalyst;

an addition device that adds an additive constituted by ammonia or an ammonia precursor to exhaust gas flowing into the exhaust gas purification apparatus;

estimating unit for estimating a $NO_x$ inflow amount, which is an amount of $NO_x$ flowing into the exhaust gas purification apparatus, using a parameter indicating an operating condition of the internal combustion engine;

first obtaining unit for obtaining an $NH_3$ adsorption amount, which is an amount of ammonia adsorbed to the exhaust gas purification apparatus, using the $NO_x$ inflow amount estimated by the estimating unit as a parameter;

control unit for controlling an amount of the additive added by the addition device, using the $NH_3$ adsorption amount obtained by the first obtaining unit as a parameter; and diagnosing unit for calculating a physical quantity that correlates with a $NO_x$ purification ability of the exhaust gas purification apparatus, using the $NO_x$ inflow amount estimated by the estimating unit as a parameter, and determining whether or not an abnormality exists in the exhaust gas purification apparatus on the basis of a calculation result, the abnormality diagnosis apparatus further including second obtaining unit for obtaining a minimum $NH_3$ adsorption amount, which is an $NH_3$ adsorption amount of the exhaust gas purification apparatus obtained on the supposition that the exhaust gas purification apparatus is normal and that an amount of $NO_x$ discharged from the internal combustion engine reaches a maximum under an identical operating condition to the operating condition of the internal combustion engine in which the $NO_x$ inflow amount is estimated by the estimating unit, wherein the diagnosing unit determines whether or not the $NO_x$ purification ability of the exhaust gas purification apparatus has deteriorated from a normal condition by comparing the physical quantity with a first threshold when the minimum $NH_3$ adsorption amount equals or exceeds a predetermined amount, and determines whether or not the $NO_x$ purification ability of the exhaust gas purification apparatus has been completely lost by comparing the physical quantity with a second threshold that is smaller than the first threshold when the minimum $NH_3$ adsorption amount is smaller than the predetermined amount.

Here, "the $NO_x$ purification ability of the exhaust gas purification apparatus has been completely lost" is assumed to include both a condition in which the exhaust gas purification apparatus has deteriorated to the extent that the exhaust gas purification apparatus is completely unable to purify the $NO_x$ contained in the exhaust gas, and a condition in which the exhaust gas purification apparatus has been removed from the exhaust passage.

In the abnormality diagnosis apparatus for an exhaust gas purification apparatus thus configured, the diagnosing unit determines the physical quantity that correlates with the $NO_x$ purification ability of the exhaust gas purification apparatus using the $NO_x$ inflow amount (an estimated $NO_x$ inflow amount) estimated by the estimating unit as a parameter, and diagnoses an abnormality in the exhaust gas purification apparatus on the basis of this physical quantity. For example, the diagnosing unit diagnoses an abnormality in the exhaust gas purification apparatus when the physical quantity is equal to or smaller than a predetermined threshold. Here, the physical quantity is a $NO_x$ purification ratio of the exhaust gas purification apparatus, an amount of $NO_x$ purified by the exhaust gas purification apparatus, or the like, for example. Further, the predetermined threshold is a value set such that when the $NO_x$ purification ratio or the $NO_x$ purification amount falls to or below the threshold, the exhaust gas purification apparatus is considered to be abnormal.

Incidentally, the amount of $NO_x$ flowing into the exhaust gas purification apparatus also varies due to factors other than the operating conditions of the internal combustion engine. For example, an amount of $NO_x$ generated when an air-fuel mixture is burned tends to increase with reductions in humidity. Therefore, when the internal combustion engine is operated in an environment with extremely low humidity (approximately 10%, for example), the amount of $NO_x$ discharged from the internal combustion engine becomes extremely large, leading to a dramatic increase in the amount of $NO_x$ flowing into the exhaust gas purification apparatus. In such cases, the estimated $NO_x$ inflow amount estimated by the estimating unit may fall short of an actual $NO_x$ inflow amount. Further, when the parameter for estimating the estimated $NO_x$ inflow amount is measured by a sensor, the estimated $NO_x$ inflow amount may fall short of the actual $NO_x$ inflow amount due to a measurement error in the sensor.

As a result, the estimated $NO_x$ inflow amount may fall short of the actual $NO_x$ inflow amount due to the humidity, the measurement error of the sensor, and so on even under identical operating conditions to the operating conditions of the internal combustion engine in which the estimated $NO_x$ inflow amount was estimated by the estimating unit.

Here, the first obtaining unit obtains the $NH_3$ adsorption amount of the exhaust gas purification apparatus using the estimated $NO_x$ inflow amount estimated by the estimating unit as a parameter. The control unit then controls the amount of additive added by the addition device in accordance with the $NH_3$ adsorption amount obtained by the first obtaining unit. When the estimated $NO_x$ inflow amount is smaller than the actual $NO_x$ inflow amount at this time, the $NH_3$ adsorption amount obtained by the first obtaining unit (referred to hereafter as an "estimated $NH_3$ adsorption amount") becomes larger than an actual $NH_3$ adsorption amount (referred to hereafter as the "actual $NH_3$ adsorption amount"). When the amount of additive added by the addition device is controlled on the basis of the estimated $NH_3$ adsorption amount in a case where the estimated $NH_3$ adsorption amount is larger than the actual $NH_3$ adsorption amount, the amount of added additive falls short of an amount corresponding to the actual $NH_3$ adsorption amount, and as a result, a deviation between the estimated $NH_3$ adsorption amount and the actual $NH_3$ adsorption amount widens.

Therefore, when the actual $NH_3$ adsorption amount is much smaller than the estimated $NH_3$ adsorption amount, abnormality diagnosis processing may be executed on the exhaust gas purification apparatus. When the abnormality diagnosis processing is executed on the exhaust gas purification apparatus in a condition where the actual $NH_3$ adsorption amount is much smaller than the estimated $NH_3$ adsorption amount, the physical quantity that correlates with the $NO_x$ purification ability of the exhaust gas purification apparatus may fall to or below the predetermined threshold even though the $NO_x$ purification ability is normal. For example, in a method where the abnormality diagnosis processing is executed when the estimated $NH_3$ adsorption amount equals or exceeds a prescribed amount determined in advance, the actual $NH_3$ adsorption amount upon execution of the abnormality diagnosis processing may be smaller than the prescribed amount. In this case, the physical quantity calculated using the estimated $NO_x$ inflow amount as a parameter may fall to or below the predetermined threshold, and as a result, an abnormality in the exhaust gas purification apparatus may be misdiagnosed even though the exhaust gas purification apparatus is normal. Furthermore, in a method where the threshold is modified in accordance with the estimated $NH_3$ adsorption amount upon execution of the abnormality diagnosis processing, the actual $NH_3$ adsorption amount upon execution of the abnormality diagnosis processing may be smaller than the estimated $NH_3$ adsorption amount. In this case, the physical quantity calculated using the estimated $NO_x$ inflow amount as a parameter falls to or below the predetermined threshold, and as a result, an abnormality is misdiagnosed in the exhaust gas purification apparatus even though the exhaust gas purification apparatus is normal.

In the abnormality diagnosis apparatus for an exhaust gas purification apparatus according to the present invention, on the other hand, the $NH_3$ adsorption amount (the minimum $NH_3$ adsorption amount) obtained in a case where the exhaust gas purification apparatus is normal and the amount of $NO_x$ discharged from the internal combustion engine reaches a maximum under identical operating conditions to the operating conditions of the internal combustion engine in which the $NO_x$ inflow amount is estimated by the estimating unit is determined, a determination as to whether or not the $NO_x$ purification ability of the exhaust gas purification apparatus has deteriorated from a normal condition is made by comparing the physical quantity with the first threshold when the minimum $NH_3$ adsorption amount equals or exceeds the predetermined amount, and a determination as to whether or not the $NO_x$ purification ability of the exhaust gas purification apparatus has been completely lost is made by comparing the physical quantity with the second threshold that is smaller than the first threshold when the minimum $NH_3$ adsorption amount is smaller than the predetermined amount.

Here, the "predetermined amount" is an amount set such that when the $NH_3$ adsorption amount of the exhaust gas purification apparatus in the normal condition equals or exceeds the predetermined amount, the $NO_x$ purification ability is sufficiently high, and when the $NH_3$ adsorption amount of the exhaust gas purification apparatus in the normal condition falls below the predetermined value, the $NO_x$ purification ability is likely to decrease rapidly. A predetermined margin may be added to this amount. Further, the "first threshold" is a value set such that when the physical quantity falls to or below the first threshold, the $NO_x$ purification ability of the exhaust gas purification apparatus may be considered to have deteriorated from the normal condition. The "second threshold" is set at a value (zero, for example) of the physical quantity at which the $NO_x$ purification ability of the exhaust gas purification apparatus is completely lost.

As described above, the minimum $NH_3$ adsorption amount is the $NH_3$ adsorption amount obtained in a case where the exhaust gas purification apparatus is normal and the amount of $NO_x$ discharged from the internal combustion engine reaches a maximum under identical operating conditions to the operating conditions of the internal combustion engine in which the $NO_x$ inflow amount is estimated by the estimating unit. In other words, the minimum $NH_3$ adsorption amount corresponds to a lower limit at which the actual $NH_3$ adsorption amount can be obtained when the exhaust gas purification apparatus is normal. Hence, when the minimum $NH_3$ adsorption amount equals or exceeds the predetermined amount and the $NO_x$ purification ability of the exhaust gas purification apparatus is normal, the actual $NH_3$ adsorption amount may be considered to equal or exceed the predetermined amount. As a result, even when the abnormality diagnosis processing is executed while the actual $NH_3$ adsorption amount is smaller than the estimated $NH_3$ adsorption amount, the physical quantity is unlikely to fall to or below the first threshold as long as the exhaust gas purification apparatus is normal. Therefore, the exhaust gas purification apparatus is unlikely to be misdiagnosed as having deteriorated when normal.

When the minimum $NH_3$ adsorption amount is smaller than the predetermined amount, on the other hand, the actual $NH_3$ adsorption amount may equal or exceed the predetermined amount or may fall short of the predetermined amount even though the exhaust gas purification apparatus is normal. Hence, when the physical quantity is compared with the first threshold while the actual $NH_3$ adsorption amount is smaller than the estimated $NH_3$ adsorption amount, the physical quantity may be equal to or smaller than the first threshold even though the exhaust gas purification apparatus is normal. Therefore, when the minimum $NH_3$ adsorption amount is smaller than the predetermined amount, it is difficult to determine with accuracy whether or not the $NO_x$ purification ability of the exhaust gas purification apparatus has deteriorated from the normal condition (i.e. whether or not the $NO_x$ purification ability has deteriorated from the normal condition but is not yet completely lost). However, a determination as to whether or not the $NO_x$ purification ability of the exhaust gas purification apparatus has been completely lost may be made even when the minimum $NH_3$ adsorption amount is smaller than the predetermined amount. In other words, when the $NO_x$ purification ability of the exhaust gas purification apparatus is not completely lost, the physical quantity remains larger than zero, but when the $NO_x$ purification ability of the exhaust gas purification apparatus is completely lost, the physical quantity falls to zero regardless of the actual $NH_3$ adsorption amount. Therefore, by comparing the physical quantity with the second threshold when the minimum $NH_3$ adsorption amount is smaller than the predetermined amount, it is possible to determine whether or not the $NO_x$ purification ability of the exhaust gas purification apparatus is completely lost, and as a result, a misdiagnosis of an abnormality in the exhaust gas purification apparatus even though the exhaust gas purification apparatus is normal can be suppressed.

Hence, with the abnormality diagnosis apparatus for an exhaust gas purification apparatus according to the present invention, a misdiagnosis of an abnormality in the $NO_x$ purification ability of the exhaust gas purification apparatus even though the $NO_x$ purification ability is normal can be suppressed even when the abnormality diagnosis processing is performed on the exhaust gas purification apparatus while the estimated $NH_3$ adsorption amount is smaller than the actual $NH_3$ adsorption amount.

In the abnormality diagnosis apparatus for an exhaust gas purification apparatus according to the present invention, the diagnosing unit may refrain from performing a diagnosis when the minimum $NH_3$ adsorption amount is equal to or smaller than a lower limit value that is smaller than the predetermined amount. Here, the lower limit value is an $NH_3$ adsorption amount (zero, for example) set such that when the minimum $NH_3$ adsorption amount falls to or below the lower limit value, the physical quantity is likely to fall to or below the second threshold even though the exhaust gas purification apparatus is normal.

When the minimum $NH_3$ adsorption amount falls to zero, the actual $NH_3$ adsorption amount may also fall to zero. When the actual $NH_3$ adsorption amount falls to zero, the physical quantity may fall to or below the second threshold even though the $NO_x$ purification ability of the exhaust gas purification apparatus is not completely lost. Therefore, when the abnormality diagnosis processing is executed while the minimum $NH_3$ adsorption amount is equal to or smaller than the lower limit value, the $NO_x$ purification ability of the exhaust gas purification apparatus may be misdiagnosed as being completely lost despite not being completely lost.

On the other hand, by ensuring that the abnormality diagnosis processing is not executed when the minimum $NH_3$ adsorption amount is equal to or smaller than the lower limit value, a misdiagnosis of complete loss of the $NO_x$ purification ability of the exhaust gas purification apparatus even though the $NO_x$ purification ability is not completely lost can be suppressed.

In the abnormality diagnosis apparatus for an exhaust gas purification apparatus according to the present invention, in a case where the minimum $NH_3$ adsorption amount equals or exceeds the predetermined amount, the diagnosing unit may calculate the physical quantity a plurality of times at different timings, determine that the $NO_x$ purification ability of the exhaust gas purification apparatus has not deteriorated from the normal condition when an average value of a plurality of calculation results is larger than the first threshold, and determine that the $NO_x$ purification ability of the exhaust gas purification apparatus has deteriorated from the normal condition when the average value of the plurality of calculation results is equal to or smaller than the first threshold. Further, in a case where the minimum $NH_3$ adsorption amount is smaller than the predetermined amount, the diagnosing unit may calculate the physical quantity a plurality of times at different timings, determine that the $NO_x$ purification ability of the exhaust gas purification apparatus is completely lost when all of the plurality of calculation results are equal to or smaller than the second threshold, and determine that the $NO_x$ purification ability of the exhaust gas purification apparatus is not completely lost when at least one of the plurality of calculation results is larger than the second threshold.

When a breakdown diagnosis is implemented using this method, a situation in which the $NO_x$ purification ability of the exhaust gas purification apparatus is determined erroneously to have deteriorated from the normal condition despite not having deteriorated can be suppressed more reliably. Moreover, a misdiagnosis of complete loss of the $NO_x$ purification ability of the exhaust gas purification apparatus even though the $NO_x$ purification ability is not completely lost can be suppressed more reliably.

According to the present invention, in an abnormality diagnosis apparatus for an exhaust gas purification apparatus having an SCR catalyst, a misdiagnosis of an abnormality in the SCR catalyst even though the SCR catalyst is normal can be suppressed.

Further features of the present invention will become apparent from the following description of exemplary embodiments with reference to the attached drawings.

DESCRIPTION OF THE EMBODIMENTS

A specific embodiment of the present invention will be described below on the basis of the drawings. Unless specified otherwise, the technical scope of the invention is not limited to dimensions, materials, shapes, relative arrangements, and so on of constituent components described in the embodiment.

Figure 1:
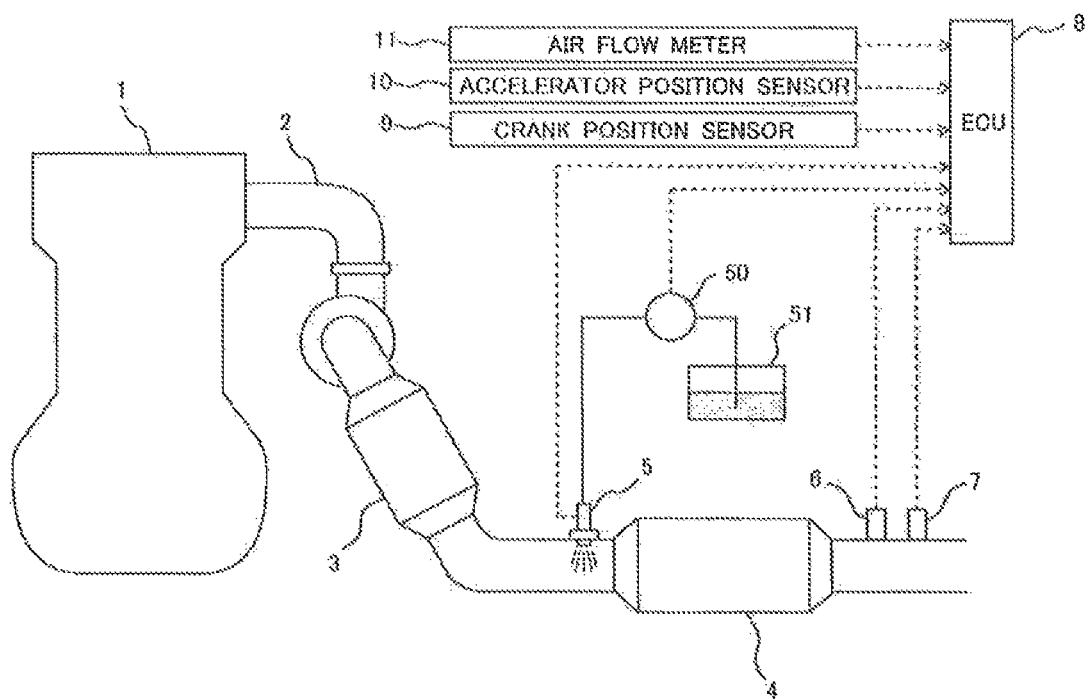
FIG. 1 is a schematic view showing a configuration of an exhaust system of an internal combustion engine to which the present invention is applied.

FIG. 1 is a schematic view showing a configuration of an exhaust system of an internal combustion engine to which the present invention is applied. An internal combustion engine 1 shown in FIG. 1 is a compression ignition type internal combustion engine (a diesel engine) that performs a lean burn operation. Note that the internal combustion engine 1 may be a spark ignition type internal combustion engine (a gasoline engine) that is capable of performing a lean burn operation.

An exhaust pipe 2 through which burned gas (exhaust gas) discharged from a cylinder flows is connected to the internal combustion engine 1. A first catalyst casing 3 is disposed midway in the exhaust pipe 2. A second catalyst casing 4 is disposed in the exhaust pipe 2 downstream of the first catalyst casing 3.

An oxidation catalyst and a particulate filter, for example, are housed in a tubular casing constituting the first catalyst casing 3. At this time, the oxidation catalyst may be carried on a catalyst carrier disposed upstream of the particulate filter, or on the particulate filter itself. Note that a three-way catalyst or a storage reduction catalyst may be housed in the first catalyst casing 3 instead of an oxidation catalyst.

A catalyst carrier carrying an SCR catalyst is housed in a tubular casing constituting the second catalyst casing 4. The catalyst carrier is formed by, for example, coating a monolith type base material having a honeycomb-shaped cross-section and formed from cordierite, Fe—Cr—Al based heat-resisting steel, or the like with an alumina-based or zeolite-based active component (a carrier). Note that a catalyst carrier carrying an oxidation catalyst may be disposed in the second catalyst casing 4 downstream of the SCR catalyst. In this case, the oxidation catalyst is provided to oxidize $NH_3$ that slips out of the SCR catalyst, from $NH_3$ supplied to the SCR catalyst. The second catalyst casing 4 corresponds to an exhaust gas purification apparatus according to the present invention.

An addition valve 5 for adding (injecting) an additive constituted by $NH_3$ or an $NH_3$ precursor to the exhaust gas is disposed in the exhaust pipe 2 between the first catalyst casing 3 and the second catalyst casing 4. The addition valve 5 is connected to an additive tank 51 via a pump 50. The pump 50 suctions the additive stored in the additive tank 51, and pumps the suctioned additive to the addition valve 5. The addition valve 5 injects the additive pumped from the pump 50 into the exhaust pipe 2. The addition valve 5, the pump 50, and the additive tank 51 together correspond to an addition device according to the present invention.

Here, $NH_3$ gas or an aqueous solution of urea, ammonium carbamate, or the like is used as the additive stored in the additive tank 51. In this embodiment, it is assumed that a urea water solution is used as the additive. When the urea water solution is injected from the addition valve 5, the urea water solution flows into the second catalyst casing 4 together with the exhaust gas. At this time, the urea water solution is pyrolyzed by heat received from, the exhaust gas or hydrolyzed by the SCR catalyst. When the urea water solution is pyrolyzed or hydrolyzed, $NH_3$ is generated. The $NH_3$ generated in this manner is adsorbed (or occluded) to the SCR catalyst. The $NH_3$ adsorbed to the SCR catalyst reacts with $NO_x$ contained in the exhaust gas so as to generate $N_2$ and water ($H_2O$). In other words, the $NH_3$ functions as a $NO_x$ reducing agent.

An electronic control unit (ECU) 8 is provided alongside the internal combustion engine 1 thus configured. The ECU 8 is an electronic control unit including a CPU, a ROM, a RAM, a backup RAM, and so on. Various sensors, such as a $NO_x$ sensor 6, an exhaust gas temperature sensor 7, a crank position sensor 9, an accelerator operation amount sensor 10, and an air flow meter 11, are electrically connected to the ECU 8.

The $NO_x$ sensor 6 is disposed in the exhaust pipe 2 downstream of the second catalyst casing 4, and outputs an electric signal correlating with a $NO_x$ concentration of the exhaust gas that flows out of the second catalyst casing 4. Note that when the second catalyst casing 4 houses the SCR catalyst and an oxidation catalyst, it is assumed that the $NO_x$ sensor 6 will be disposed between the SCR catalyst and the oxidation catalyst. The exhaust gas temperature sensor 7 is disposed in the exhaust pipe 2 downstream of the second catalyst casing 4, and outputs an electric signal correlating with a temperature of the exhaust gas flowing out of the second catalyst casing 4.

The crank position sensor 9 outputs an electric signal correlating with a rotation position of an output shaft (a crankshaft) of the internal combustion engine 1. The accelerator operation amount sensor 10 outputs an electric signal correlating with an operation amount of an accelerator pedal (an accelerator opening). The air flow meter 11 outputs an electric signal correlating with an amount (a mass) of air taken into the internal combustion engine 1.

Various devices (a fuel injection valve and so on, for example) attached to the internal combustion engine 1, the addition valve 5, the pump 50, and so on are also electrically connected to the ECU 8. The ECU 8 electrically controls the various devices of the internal combustion engine 1, the addition valve 5, the pump 50, and the like on the basis of the output signals from the various sensors described above. For example, as well as conventional control such as fuel injection control of the internal combustion engine 1, the ECU 8 executes addition control for injecting the additive intermittently through the addition valve 5 and processing (abnormality diagnosis processing) for diagnosing an abnormality in the second catalyst casing 4.

First, in the addition control, the ECU 8 determines an estimated value (an estimated $NH_3$ adsorption amount) of an amount of $NH_3$ adsorbed to the SCR catalyst in the second catalyst casing 4, and controls the addition valve 5 on the basis of the estimated $NH_3$ adsorption amount.

The estimated $NH_3$ adsorption amount is determined by integrating a value obtained by subtracting an amount of $NH_3$ consumed by the SCR catalyst (an amount of $NH_3$ consumed during $NO_x$ reduction) and an $NH_3$ slippage amount from an amount of $NH_3$ supplied to the SCR catalyst (the $NH_3$ generated when the urea water solution is pyrolyzed in the exhaust gas and the $NH_3$ generated when the urea water solution is hydrolyzed in the SCR catalyst).

The amount of $NH_3$ flowing into the SCR catalyst is calculated using the amount of urea water solution added by the addition valve 5 as a parameter.

Figure 2:
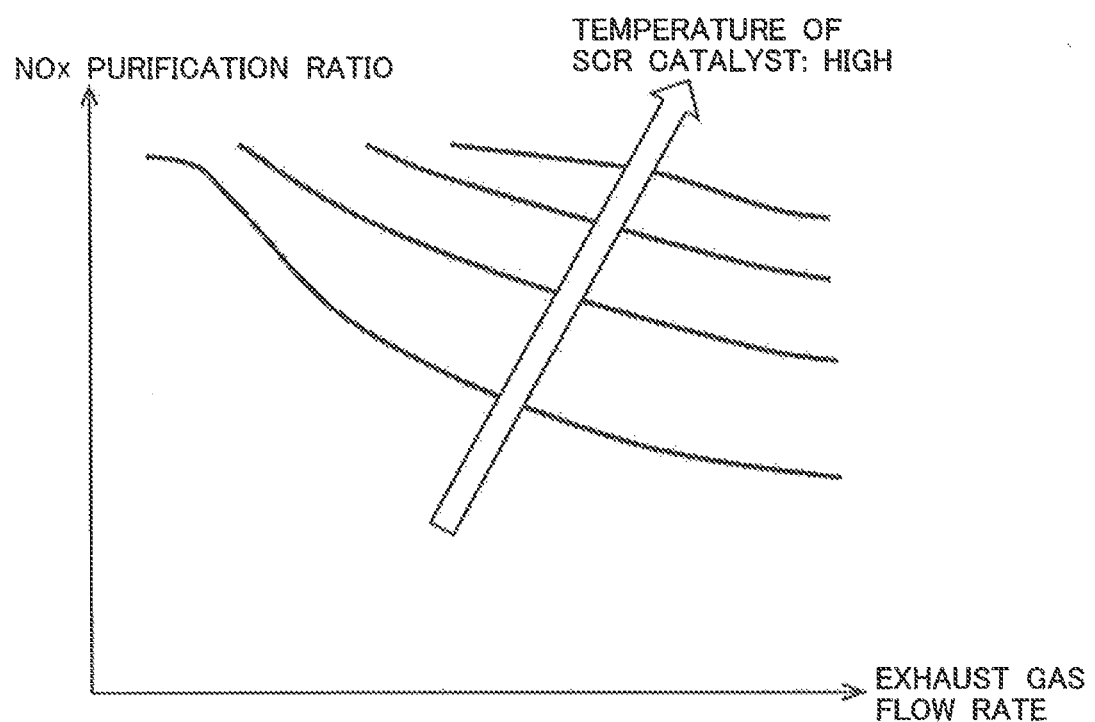
FIG. 2 is a view showing a relationship between a flow rate of exhaust gas passing through an SCR catalyst, a temperature of the SCR catalyst, and a $NO_x$ purification ratio of the SCR catalyst.

The amount of $NH_3$ consumed in the SCR catalyst is calculated using a $NO_x$ inflow amount and a $NO_x$ purification ratio as parameters. At this time, the $NO_x$ inflow amount correlates with an amount of $NO_x$ discharged from the internal combustion engine 1 (an amount of $NO_x$ generated when an air-fuel mixture is burned in the internal combustion engine 1). The amount of $NO_x$ discharged from the internal combustion engine 1 correlates with an amount of oxygen contained in the air-fuel mixture, an amount of fuel contained in the air-fuel mixture, a fuel injection timing, and an engine rotation speed. The amount of oxygen contained in the air-fuel mixture correlates with the intake air amount (the output signal of the air flow meter 11). The amount of fuel contained in the air-fuel mixture correlates with a fuel injection amount. Accordingly, the ECU 8 calculates an estimated value of the $NO_x$ inflow amount (an estimated $NO_x$ inflow amount) using the output signal of the air flow meter 11, the fuel injection amount, the fuel injection timing, and the engine rotation speed as parameters. Note that relationships between the estimated $NO_x$ inflow amount and the various parameters described above may be determined in advance by experiment and stored in the ROM of the ECU 8 in the form of a map or a function. Estimating unit according to the present invention is realized by having the ECU 8 determine the estimated $NO_x$ inflow amount in this manner. Further, the $NO_x$ purification ratio is estimated using a flow rate of the exhaust gas flowing into the SCR catalyst (a sum of the intake air amount per unit time and the fuel injection amount per unit time) and a temperature of the SCR catalyst as parameters. FIG. 2 is a view showing a relationship between the flow rate of the exhaust gas (the sum of the intake air amount per unit, time and the fuel injection amount per unit time), the temperature of the SCR catalyst, and the $NO_x$ purification ratio. The $NO_x$ purification ratio tends to decrease as the exhaust gas flow rate increases and increase as the temperature of the SCR catalyst increases (note, however, that when the temperature of the SCR catalyst exceeds an upper limit temperature (350° C., for example), the $NO_x$ purification ratio tends to decrease as the temperature of the SCR catalyst increases). Hence, a map or a function defining a relationship such as that shown in FIG. 2 is determined in advance, and the $NO_x$ purification ratio is determined on the basis of the map or function.

Figure 3:
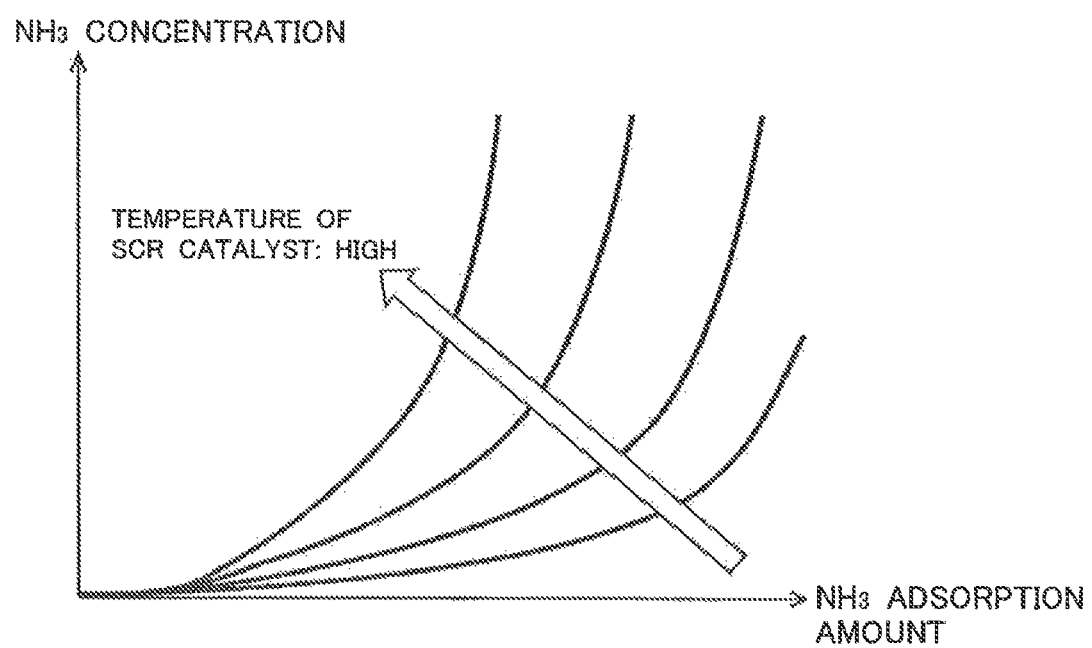
FIG. 3 is a view showing a relationship between an $NH_3$ adsorption amount of the SCR catalyst, the temperature of the SCR catalyst, and an $NH_3$ concentration of exhaust gas flowing out of the SCR catalyst.

The $NH_3$ slippage amount is determined using a previous calculation value of the estimated $NH_3$ adsorption amount, the temperature of the SCR catalyst, and the flow rate of the exhaust gas passing through the SCR catalyst per unit time as parameters. FIG. 3 is a view showing a relationship between the $NH_3$ adsorption amount, the temperature of the SCR catalyst, and the $NH_3$ concentration of the exhaust gas flowing out of the SCR catalyst in a case where the flow rate of the exhaust gas passing through the SCR catalyst is constant. In FIG. 3, the $NH_3$ concentration of the exhaust gas flowing out of the SCR catalyst increases as the $NH_3$ adsorption amount increases, and increases as the temperature of the SCR catalyst increases. It may therefore be said that when the flow rate of the exhaust gas passing through the SCR catalyst is constant, the $NH_3$ slippage amount increases as the $NH_3$ adsorption amount increases and as the temperature of the SCR catalyst increases. When the $NH_3$ concentration of the exhaust gas flowing out of the SCR catalyst is constant, on the other hand, the $NH_3$ slippage amount per unit time increases as the flow rate of the exhaust gas passing through the SCR catalyst per unit time increases. Hence, the ECU 8 calculates the $NH_3$ slippage amount by determining the $NH_3$ concentration of the exhaust gas flowing out of the SCR catalyst on the basis of a relationship such as that shown in FIG. 3, and multiplying the exhaust gas flow rate (the sum of the intake air amount per unit time and the fuel injection amount per unit time) per unit time by the $NH_3$ concentration.

When the estimated $NH_3$ adsorption amount determined using the method described above falls below a prescribed amount, the ECU 8 injects the urea water solution through the addition valve 5. Here, the "prescribed amount" is an amount obtained by subtracting a predetermined margin from a maximum amount of $NH_3$ that can be adsorbed to the SCR catalyst (an $NH_3$ adsorption amount when an $NH_3$ adsorption rate and an $NH_3$ desorption rate of the SCR catalyst are in a state of equilibrium), for example. Note that first obtaining unit according to the present invention is realized by having the ECU 8 determine the estimated $NH_3$ adsorption amount using the method described above. Further, control unit according to the present invention is realized by having the ECU 8 control the addition valve 5 using the method described above.

When the estimated $NH_3$ adsorption amount determined using the method described above equals or exceeds the prescribed amount, the ECU 8 executes the abnormality diagnosis processing. More specifically, when the estimated $NH_3$ adsorption amount equals or exceeds the prescribed amount, the ECU 8 determines a physical quantity that correlates with a $NO_x$ purification ability of the SCR catalyst, and diagnoses an abnormality in the SCR catalyst on the basis of this physical quantity.

The $NO_x$ purification ratio of the SCR catalyst, the amount of $NO_x$ purified by the SCR catalyst, and so on, for example, may be used as the physical quantity indicating the $NO_x$ purification ability of the SCR catalyst. An example in which the $NO_x$ purification ratio is used as the physical quantity that correlates with the $NO_x$ purification ability of the SCR catalyst will be described below. The $NO_x$ purification ratio used in the abnormality diagnosis processing is determined by a different method to the $NO_x$ purification ratio used to estimate the $NH_3$ adsorption amount. More specifically, the $NO_x$ purification ratio used in the abnormality diagnosis processing is calculated using Equation (1), shown below.

$$Eno_x = (Ano_x\text{in} - Ano_x\text{out})/Ano_x\text{in} \quad (1)$$

In Equation (1), $Eno_x$ is the $NO_x$ purification ratio. $Ano_x$in is the $NO_x$ inflow amount, which is substituted for the estimated $NO_x$ inflow amount calculated using the intake air amount, the fuel injection amount, the fuel injection timing, and the engine rotation speed as parameters, as described above. $Ano_x$out is an amount of $NO_x$ flowing out of the SCR catalyst (referred to hereafter as a "$NO_x$ outflow amount"), which is substituted for a value determined by multiplying the output signal of the $NO_x$ sensor 6 (the $NO_x$ concentration) by the exhaust gas flow rate per unit time (the sum of the intake air amount per unit time and the fuel injection amount per unit time).

Once the $NO_x$ purification ratio $Eno_x$ has been calculated from Equation (1), the ECU 8 determines whether or not the $NO_x$ purification ratio $Eno_x$ is larger than a predetermined threshold. Here, the "predetermined threshold" is a value set such that when the $NO_x$ purification ratio $Eno_x$ falls to or below the threshold, the SCR catalyst is considered to be abnormal. Hence, the ECU 8 diagnoses the SCR catalyst to be normal when the $NO_x$ purification ratio $Eno_x$ is larger than the predetermined threshold, and diagnoses the SCR catalyst to be abnormal when the $NO_x$ purification ratio $Eno_x$ is equal to or smaller than the predetermined threshold.

Incidentally, an actual inflowing $NO_x$ amount (an actual $NO_x$ inflow amount) varies due to factors other than the parameters (the intake air amount, the fuel injection amount, the fuel injection timing, and the engine rotation speed) used to estimate the estimated $NO_x$ inflow amount. For example, the amount of $NO_x$ generated as the air-fuel mixture is burned tends to increase together with reductions in humidity. Therefore, when the internal combustion engine 1 is operated in an environment having extremely low humidity (approximately 10%, for example), the amount of $NO_x$ discharged from the internal combustion engine 1 becomes extremely large, leading to a dramatic increase in the actual $NO_x$ inflow amount. As a result, the actual $NO_x$ inflow amount may become larger than the estimated $NO_x$ inflow amount. Further, when the intake air amount is used as a parameter for estimating the estimated $NO_x$ inflow amount, the estimated $NO_x$ inflow amount may fall below the actual $NO_x$ inflow amount due to a measurement error in the sensor (the air flow meter 11) that measures the intake air amount. Accordingly, the actual $NO_x$ inflow amount may become larger than the estimated $NO_x$ inflow amount due to variation in the humidity, the measurement error of the sensor, and so on even under identical operating conditions to the operating conditions of the internal combustion engine 1 in which the estimated $NO_x$ inflow amount was estimated.

Moreover, the estimated $NH_3$ adsorption amount used to control addition of the urea water solution is determined using the estimated $NO_x$ inflow amount as a parameter. Therefore, when the estimated $NO_x$ inflow amount falls below the actual $NO_x$ inflow amount, the estimated $NH_3$ adsorption amount becomes larger than an actual $NH_3$ adsorption amount. When the estimated $NH_3$ adsorption amount is larger than the actual $NH_3$ adsorption amount, and the urea water solution addition control is performed on the basis of the estimated $NH_3$ adsorption amount, the amount of added urea water solution falls short of an amount corresponding to the actual $NH_3$ adsorption amount, and as a result, the actual $NH_3$ adsorption amount decreases. When this condition remains established, a deviation between the estimated $NH_3$ adsorption amount and the actual $NH_3$ adsorption amount widens.

When, as a result, the actual $NH_3$ adsorption amount falls greatly below the estimated $NH_3$ adsorption amount, the abnormality diagnosis processing may be executed on the SCR catalyst. For example, in a method where the abnormality diagnosis processing is executed when the estimated $NH_3$ adsorption amount equals or exceeds a prescribed amount, the actual $NH_3$ adsorption amount upon execution of the abnormality diagnosis processing may be considerably smaller than the prescribed amount. In this case, the $NO_x$ purification ratio $Eno_x$ may fall to or below the predetermined threshold even though the $NO_x$ purification ability of the SCR catalyst is normal. As a result, an abnormality in the SCR catalyst may be misdiagnosed even though the SCR catalyst is normal.

The $NO_x$ inflow amount may be estimated on the assumption that the amount of $NO_x$ discharged from the internal combustion engine 1 is at a maximum, and calculation of the estimated $NH_3$ adsorption amount and the urea water solution addition control may be performed in accordance therewith. However, when the humidity is not particularly low or the measurement error of the air flow meter 11 is small, the estimated $NH_3$ adsorption amount falls below the actual $NH_3$ adsorption amount, and as a result, problems such as excessive addition of the urea water solution, an unnecessary increase in an amount of consumed urea water solution, and an unnecessary increase in the $NH_3$ slippage amount occur. Hence, the estimated $NH_3$ adsorption amount used in the addition control is preferably estimated without taking into consideration humidity reductions and the like.

Therefore, in this embodiment, an $NH_3$ adsorption amount (a minimum $NH_3$ adsorption amount) obtained in a case where the $NO_x$ inflow amount is at a maximum is determined only during the abnormality diagnosis processing, and a diagnosis mode is modified in accordance with the minimum $NH_3$ adsorption amount. Here, the "minimum $NH_3$ adsorption amount" is an $NH_3$ adsorption amount obtained in a case where the SCR catalyst is normal and the amount of $NO_x$ discharged from the internal combustion engine 1 reaches a maximum under identical operating conditions to the operating conditions of the internal combustion engine 1 in which the estimated $NO_x$ inflow amount was estimated.

More specifically, when the minimum $NH_3$ adsorption amount upon execution of the abnormality diagnosis processing equals or exceeds a predetermined amount, a determination is made as to whether or not the $NO_x$ purification ability of the SCR catalyst has deteriorated from a normal condition by comparing the $NO_x$ purification ratio with a first threshold. Further, when the minimum $NH_3$ adsorption amount upon execution of the abnormality diagnosis processing is smaller than the predetermined amount, a determination is made as to whether or not the $NO_x$ purification ability of the SCR catalyst has been completely lost by comparing the $NO_x$ purification ratio with a second threshold.

The predetermined amount is set at a smaller $NH_3$ adsorption amount than the prescribed amount such that when the $NH_3$ adsorption amount of the normal SCR catalyst falls below the predetermined amount, the $NO_x$ purification ratio is likely to decrease rapidly. In other words, the predetermined amount is an amount set such that when the SCR catalyst is normal and the $NH_3$ adsorption amount of the SCR catalyst equals or exceeds the predetermined amount, a substantially identical $NO_x$ purification ratio to the $NO_x$ purification ratio obtained when the $NH_3$ adsorption amount equals or exceeds the prescribed amount can be obtained.

Figure 4:
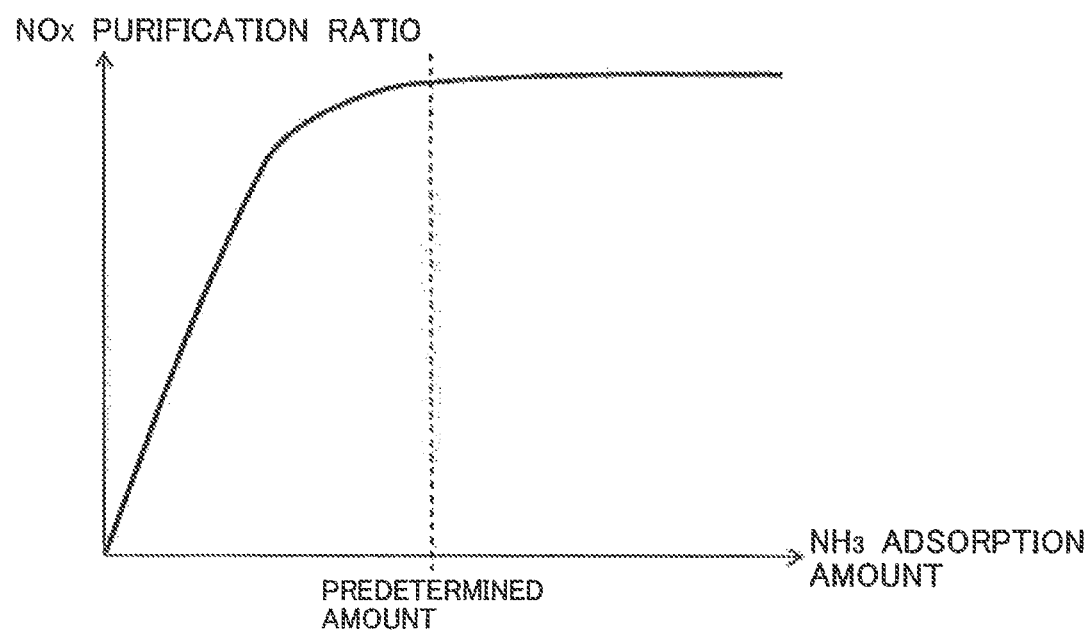
FIG. 4 is a view showing a relationship between the $NH_3$ adsorption amount of the SCR catalyst and the $NO_x$ purification ratio of the SCR catalyst.

FIG. 4 is a view showing a relationship between the actual $NH_3$ adsorption amount and the $NO_x$ purification ratio when the SCR catalyst is normal. As shown in FIG. 4, when the actual $NH_3$ adsorption amount equals or exceeds the predetermined amount, the $NO_x$ purification ratio sticks to a maximum value. When the actual $NH_3$ adsorption amount is smaller than the predetermined amount, on the other hand, the $NO_x$ purification ratio decreases steadily as the actual $NH_3$ adsorption amount decreases. Note that even when the SCR catalyst is normal, the actual $NH_3$ adsorption amount decreases steadily as the temperature of the SCR catalyst increases, and therefore the predetermined amount is preferably modified to a steadily larger value as the temperature of the SCR catalyst increases.

Further, the first threshold is a value set such that when the $NO_x$ purification ratio falls to or below the first threshold, the $NO_x$ purification ability of the SCR catalyst may be considered to have deteriorated from the normal condition. This value is determined in advance by adaptation processing using experiments or the like. The second threshold is a $NO_x$ purification ratio obtained when the $NO_x$ purification ability of the SCR catalyst is completely lost (for example, a $NO_x$ purification ratio when the $NO_x$ purification ability has completely disappeared due to deterioration of the SCR catalyst or a $NO_x$ purification ratio when the second catalyst casing 4 housing the SCR catalyst is removed from the exhaust pipe 2), and is set at zero.

Here, as described above, the minimum $NH_3$ adsorption amount is an $NH_3$ adsorption amount obtained in a case where the exhaust gas purification apparatus is normal and the amount of $NO_x$ discharged from the internal combustion engine reaches a maximum under identical operating conditions to the operating conditions of the internal combustion engine 1 in which the estimated $NO_x$ inflow amount was estimated. In other words, the minimum $NH_3$ adsorption amount corresponds to a lower limit at which the actual $NH_3$ adsorption amount can be obtained when the SCR catalyst is normal. Hence, when the minimum $NH_3$ adsorption amount equals or exceeds the predetermined amount and the SCR catalyst is normal, the actual $NH_3$ adsorption amount may be considered to equal or exceed the predetermined amount. As a result, even when the abnormality diagnosis processing is executed while the actual $NH_3$ adsorption amount is smaller than the estimated $NH_3$ adsorption amount, the $NO_x$ purification ratio $Eno_x$ is unlikely to fall to or below the first threshold as long as the SCR catalyst is normal. Therefore, when the minimum $NH_3$ adsorption amount equals or exceeds the predetermined amount, the determination as to whether or not the $NO_x$ purification ability of the SCR catalyst has deteriorated from the normal condition can be made with a high degree of precision.

When the minimum $NH_3$ adsorption amount is smaller than the predetermined amount, on the other hand, the actual $NH_3$ adsorption amount may equal or exceed the predetermined amount or may fall short of the predetermined amount even while the exhaust gas purification apparatus is normal. Hence, when the $NO_x$ purification ratio $Eno_x$ is compared with the first threshold while the actual $NH_3$ adsorption amount is smaller than the estimated $NH_3$ adsorption amount, the $NO_x$ purification ratio $Eno_x$ may be equal to or smaller than the first threshold even though the SCR catalyst is normal. Therefore, when the minimum $NH_3$ adsorption amount is smaller than the predetermined amount, it is difficult to detect with accuracy a condition in which the $NO_x$ purification ability of the SCR catalyst has deteriorated from the normal condition (a condition in which the $NO_x$ purification ability has deteriorated from the normal condition but is not yet completely lost). However, the determination as to whether or not the $NO_x$ purification ability of the SCR catalyst has been completely lost may be made even when the minimum $NH_3$ adsorption amount is smaller than the predetermined amount. In other words, when the $NO_x$ purification ability of the SCR catalyst is not completely lost, the $NO_x$ purification ratio remains larger than zero, but when the $NO_x$ purification ability of the SCR catalyst is completely lost, the $NO_x$ purification ratio falls to zero. Therefore, by comparing the $NO_x$ purification ratio with the second threshold when the minimum $NH_3$ adsorption amount is smaller than the predetermined amount, it is possible to determine with accuracy whether or not the $NO_x$ purification ability of the SCR catalyst has been completely lost.

Here, the minimum $NH_3$ adsorption amount is determined using a similar method to the estimated $NH_3$ adsorption amount described above. On the other hand, a different value to the estimated $NO_x$ inflow amount is used as the $NO_x$ inflow amount used to determine the amount of $NH_3$ consumed by the SCR catalyst. More specifically, a value (referred to hereafter as a "maximum $NO_x$ inflow amount") obtained in a case where the amount of $NO_x$ discharged from the internal combustion engine 1 reaches a maximum is used. For example, the maximum $NO_x$ inflow amount is a $NO_x$ inflow amount obtained in a case where the measurement error of the air flow meter 11 reaches a maximum at a humidity (approximately 10%, for example) at which a maximum amount of $NO_x$ is generated by burning the air-fuel mixture, and is determined by multiplying a predetermined coefficient (referred to hereafter as an "estimation deviation coefficient") by the estimated $NO_x$ inflow amount. The estimation deviation coefficient is determined in advance by adaptation processing using experiments or the like, taking into consideration the measurement error of the air flow meter 11 and the humidity at which the amount of $NO_x$ generated by burning the air-fuel mixture reaches a maximum.

Figure 5:
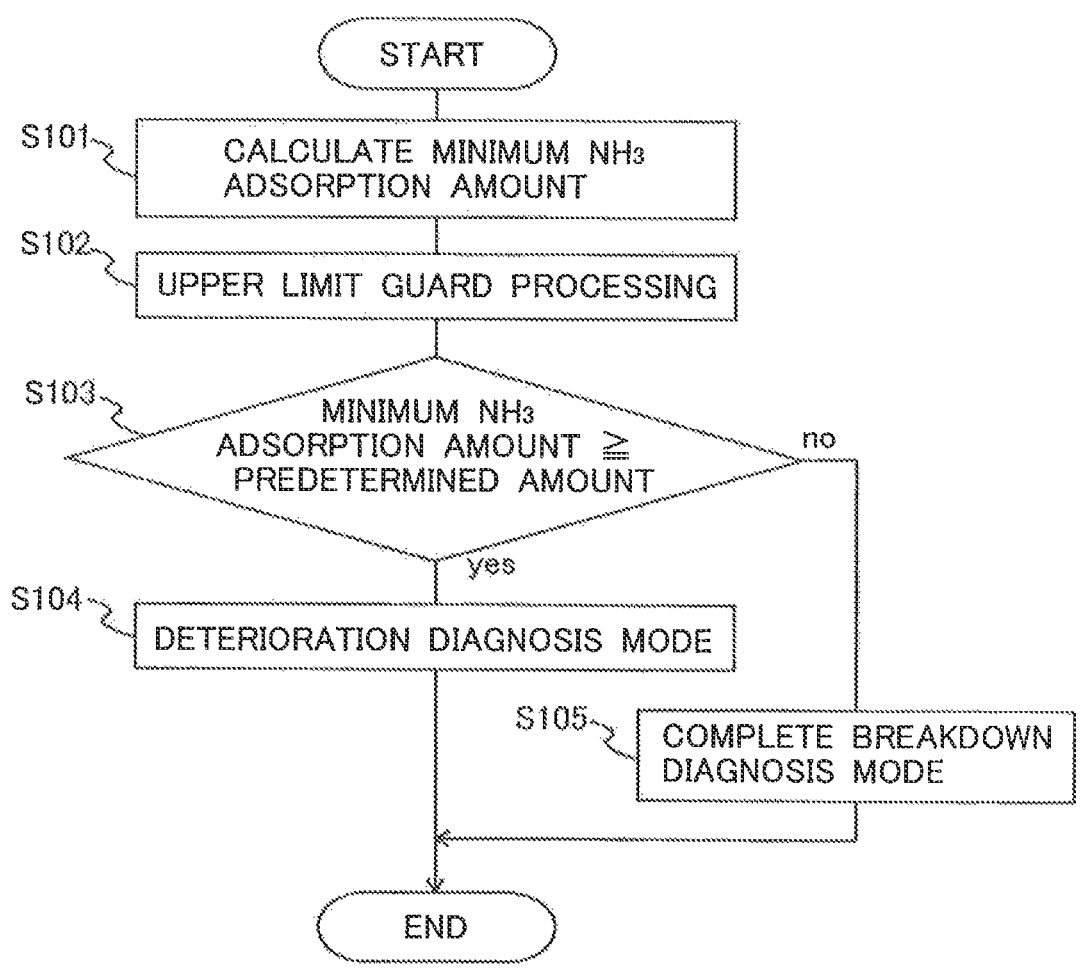
FIG. 5 is a flowchart showing a processing routine executed by an ECU to switch a diagnosis mode in accordance with a minimum $NH_3$ adsorption amount.
Figure 6:
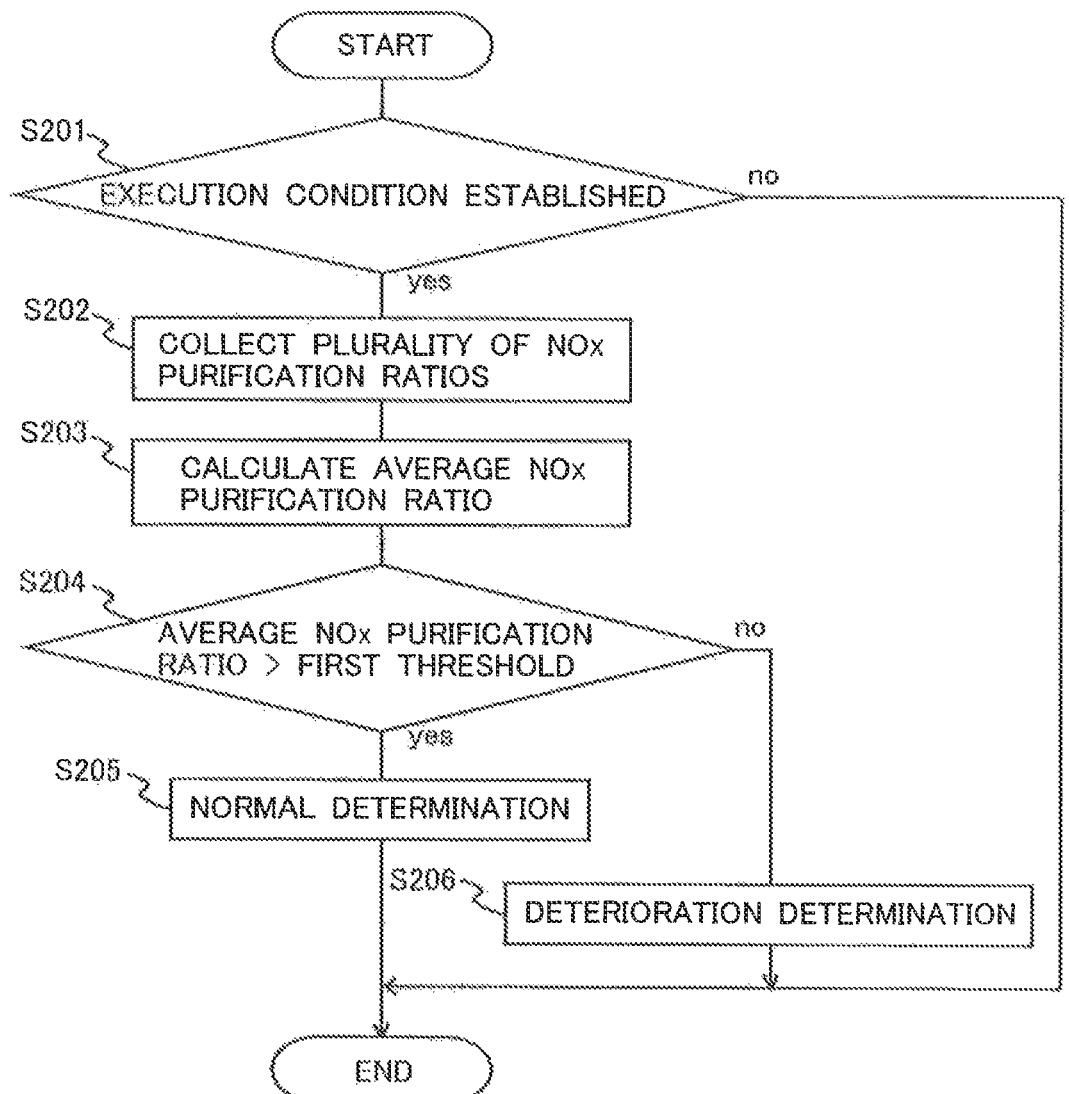
FIG. 6 is a flowchart showing a processing routine executed by the ECU to determine whether or not a $NO_x$ purification ability of the SCR catalyst has deteriorated from a normal condition.
Figure 7:
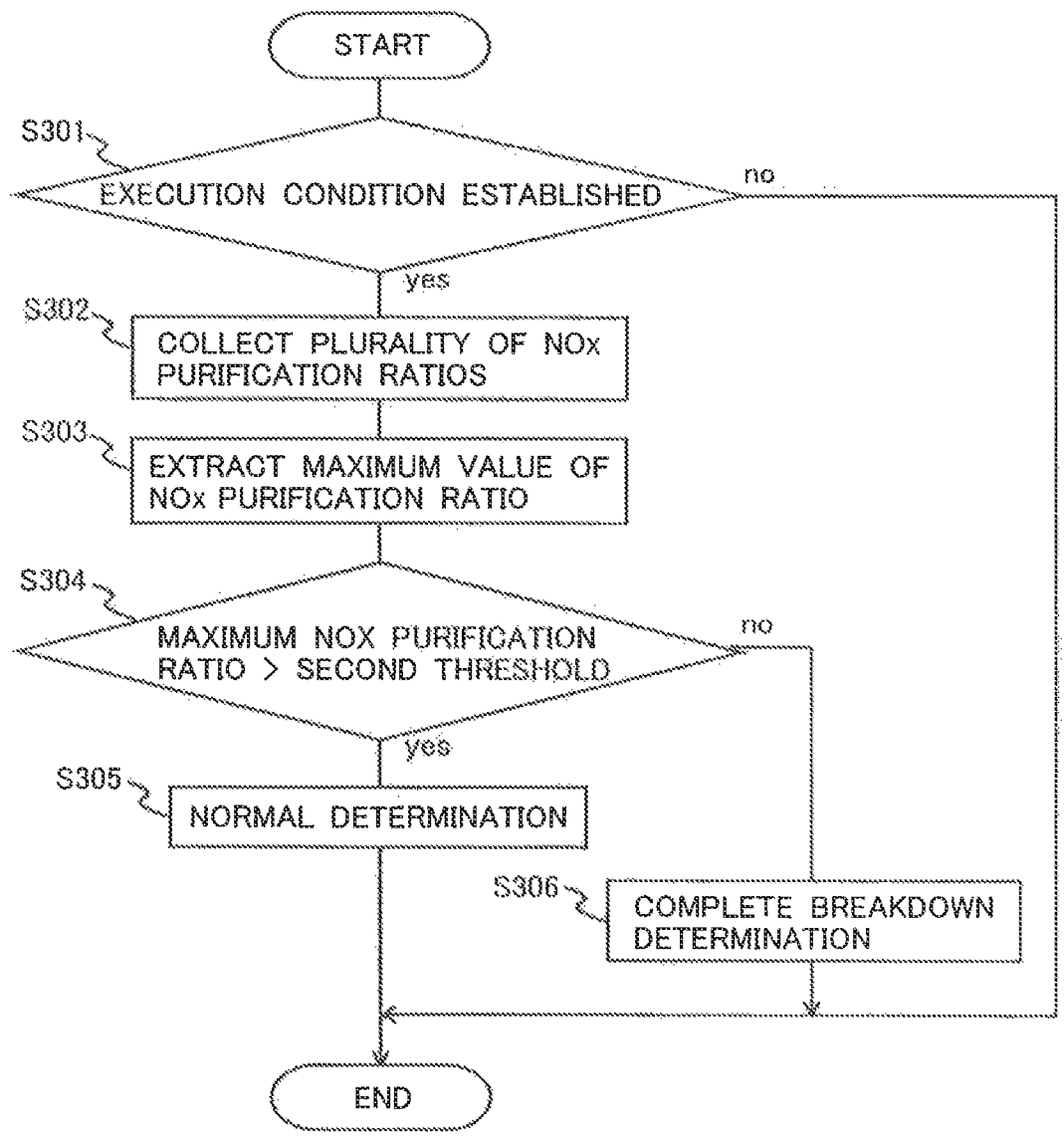
FIG. 7 is a flowchart showing a processing routine executed by the ECU to determine whether or not the $NO_x$ purification ability of the SCR catalyst is completely lost.

Procedures executed during the abnormality diagnosis processing according to this embodiment will now be described on the basis of FIGS. 5 to 7. FIG. 5 is a flowchart showing a processing routine executed by the ECU 8 to switch the diagnosis mode in accordance with the minimum $NH_3$ adsorption amount. FIG. 6 is a flowchart showing a processing routine executed by the ECU 8 to determine whether or not the $NO_x$ purification ability of the SCR catalyst has deteriorated from the normal condition. FIG. 7 is a flowchart showing a processing routine executed by the ECU 8 to determine whether or not the $NO_x$ purification ability of the SCR catalyst is completely lost.

The processing routine of FIG. 5 is executed repeatedly by the ECU 8 when the estimated $NH_3$ adsorption amount equals or exceeds the prescribed amount, and is stored in the ROM of the ECU 8 in advance.

In the processing routine of FIG. 5, the ECU 8 calculates the minimum $NH_3$ adsorption amount in processing of S101. More specifically, the ECU 8 calculates the minimum $NH_3$ adsorption amount by subtracting the amount of $NH_3$ consumed by the SCR catalyst and the $NH_3$ slippage amount from the amount of $NH_3$ flowing into the SCR catalyst. At this time, the amount of $NH_3$ consumed by the SCR catalyst is calculated using the maximum $NO_x$ inflow amount and the $NO_x$ purification ratio as parameters. More specifically, first, the ECU 8 calculates the estimated $NO_x$ inflow amount using the output signal of the air flow meter 11, the fuel injection amount, the fuel injection timing, and the engine rotation speed as parameters. Next, the ECU 8 calculates the maximum $NO_x$ inflow amount by multiplying the estimation deviation coefficient by the estimated $NO_x$ inflow amount. Further, the ECU 8 calculates the $NO_x$ purification ratio using the flow rate of the exhaust gets flowing into the SCR catalyst and the temperature of the SCR catalyst as parameters. The ECU 8 then calculates the amount of $NO_x$ purified in the SCR catalyst by multiplying the maximum $NO_x$ inflow amount by the $NO_x$ purification ratio, and converts this $NO_x$ amount into an amount of $NH_3$ (i.e. the amount of $NH_3$ consumed by the SCR catalyst).

Figure 8:
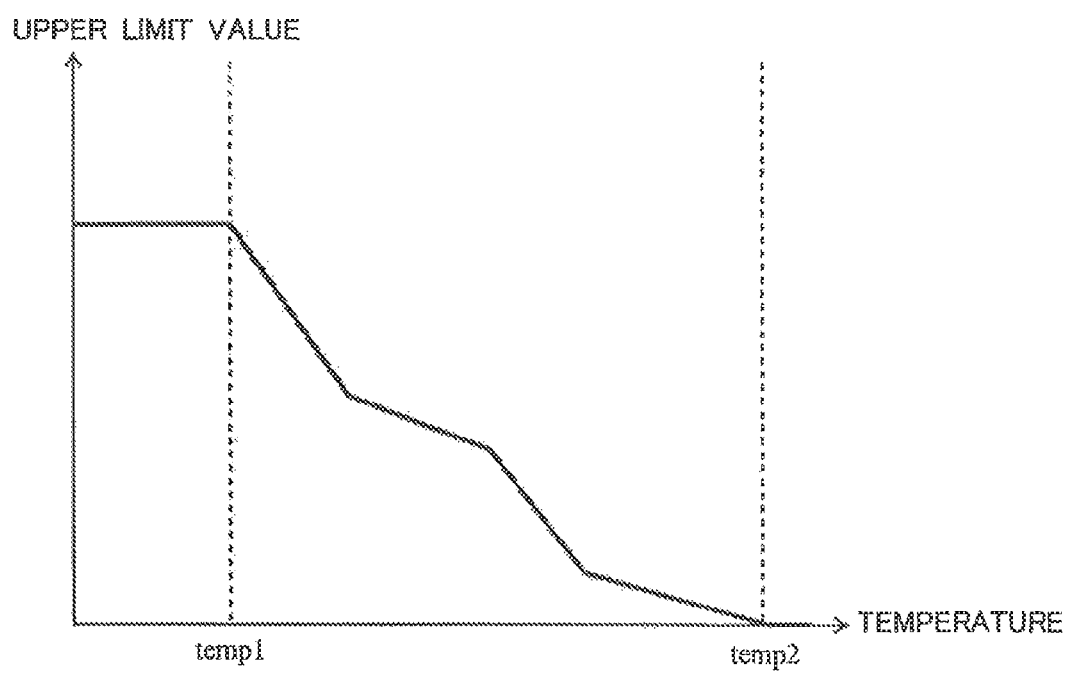
FIG. 8 is a view showing a relationship between the temperature of the SCR catalyst and an upper limit value of an amount of $NH_3$ that can be adsorbed to the SCR catalyst in a condition where the SCR catalyst is normal and an amount of $NO_x$ discharged from the internal combustion engine is at a maximum.

In processing of S102, the ECU 8 implements upper limit guard processing on the minimum $NH_3$ adsorption amount determined in the processing of S101. The amount of $NH_3$ that can be adsorbed to the SCR catalyst varies in accordance with the temperature of the SCR catalyst. Here, FIG. 8 shows a relationship between the temperature of the SCR catalyst and an upper limit value of the amount of $NH_3$ that can be adsorbed to the SCR catalyst in a condition where the SCR catalyst is normal and the amount of $NO_x$ discharged from the internal combustion engine 1 is at a maximum. In FIG. 8, when the temperature of the SCR catalyst is equal to or lower than a first temperature temp1 (250° C., for example), the upper limit value of the amount of $NH_3$ that can be adsorbed to the SCR catalyst is substantially constant. After the temperature of the SCR catalyst exceeds the first temperature temp1, the upper limit value of the amount of $NH_3$ that can be adsorbed to the SCR catalyst decreases steadily as the temperature of the SCR catalyst increases. When the temperature of the SCR catalyst reaches or exceeds a second temperature temp2 (450° C., for example) that is higher than the first temperature temp1, the amount of $NH_3$ that can be adsorbed to the SCR catalyst reaches zero. Hence, the ECU 8 compares the minimum $NH_3$ adsorption amount determined in the processing of S102 with the upper limit value specified from the temperature of the SCR catalyst, and sets the smaller value thereof as the minimum $NH_3$ adsorption amount. Note that a measurement value from the exhaust gas temperature sensor 7 may be used as the temperature of the SCR catalyst. Alternatively, a value estimated from the operating conditions of the internal combustion engine 1 may be used.

Here, second obtaining unit according to the present invention is realized by having the ECU 8 execute the processing of S101 and S102.

In processing of S103, the ECU 8 determines whether or not the minimum $NH_3$ adsorption amount set in the processing of S102 equals or exceeds the predetermined amount. As described above, the predetermined amount is a smaller $NH_3$ adsorption amount than the prescribed amount, and is set such that when the $NH_3$ adsorption amount of the normal SCR catalyst falls below the predetermined amount, the $NO_x$ purification ratio is likely to decrease rapidly.

When an affirmative determination is obtained in the processing of S103, the ECU 8 advances to processing of S104 in order to select a deterioration diagnosis mode. Here, the deterioration diagnosis mode is a mode for determining whether or not the $NO_x$ purification ability of the SCR catalyst has deteriorated from the normal condition by comparing the $NO_x$ purification ratio of the SCR catalyst with the first threshold.

When a negative determination is obtained in the processing of S103, on the other hand, the ECU 8 advances to processing of S105 in order to select a complete breakdown diagnosis mode. Here, the complete breakdown diagnosis mode is a mode for determining whether or not the $NO_x$ purification ability of the SCR catalyst has been completely lost by comparing the $NO_x$ purification ratio of the SCR catalyst with the second threshold.

When the deterioration diagnosis mode is selected in the processing routine of FIG. 5, the ECU 8 executes the processing routine of FIG. 6. In the processing routine of FIG. 6, first, in processing of S201, the ECU 8 determines whether or not an execution condition of deterioration diagnosis processing is established. Here, the execution condition is established when the estimated $NH_3$ adsorption amount equals or exceeds the prescribed amount, the temperature of the SCR catalyst belongs to a suitable temperature range (200° C. to 350° C., for example) for $NO_x$ purification, the intake air amount of the internal combustion engine 1 is comparatively large, and so on.

When a negative determination is obtained in the processing of S201, the ECU 8 terminates execution of the current processing routine. When an affirmative determination is obtained in the processing of S201, the ECU 8 advances to processing of S202.

In the processing of S202, the ECU 8 calculates the $NO_x$ purification ratio using the estimated $NO_x$ inflow amount, a measurement value from the $NO_x$ sensor 6, and the measurement value from the air flow meter 11 as parameters. The $NO_x$ purification ratio is calculated a plurality of times at different timings. The calculation processing performed a plurality of times is preferably implemented under identical operating conditions of the internal combustion engine 1. Note that when the calculation processing is implemented a plurality of times under different operating conditions, the obtained $NO_x$ purification ratios may be corrected to values obtained under identical operating conditions.

In processing of S203, the ECU 8 calculates an average value (an average $NO_x$ purification ratio) of the plurality of $NO_x$ purification ratios calculated in the processing of S202. Next, the ECU 8 advances to processing of S204 in order to determine whether or not the average $NO_x$ purification ratio is larger than the first threshold.

When an affirmative determination is obtained in the processing of S204, the ECU 8 advances to processing of S205 and determines in S205 that the $NO_x$ purification ability of the SCR catalyst has not deteriorated (a normal determination). When a negative determination is obtained in the processing of S204, on the other hand, the ECU 8 advances to processing of S206 and determines in S206 that the $NO_x$ purification ability of the SCR catalyst has deteriorated (a deterioration determination).

When the complete breakdown diagnosis mode is selected in the processing routine of FIG. 5, the ECU 8 executes the processing routine of FIG. 7. In the processing routine of FIG. 7, first, in processing of S301, the ECU 8 determines whether or not an execution condition of complete breakdown diagnosis processing is established. Here, the execution condition is established when the estimated $NH_3$ adsorption amount equals or exceeds the prescribed amount, the temperature of the SCR catalyst belongs to a suitable temperature range (200° C. to 350° C., for example) for $NO_x$ purification, the intake air amount of the internal combustion engine 1 is comparatively small, and so on.

When a negative determination is obtained in the processing of S301, the ECU 8 terminates execution of the current processing routine. When an affirmative determination is obtained in the processing of S301, the ECU 8 advances to processing of S302.

In the processing of S302, the ECU 8 calculates the $NO_x$ purification ratio a plurality of times in a similar manner to the processing of S202 in the routine of FIG. 6, described above. Next, in processing of S303, the ECU 8 extracts the largest $NO_x$ purification ratio (the maximum $NO_x$ purification ratio) from the plurality of $NO_x$ purification ratios calculated in the processing of S302.

In processing of S304, the ECU 8 determines whether or not the maximum $NO_x$ purification ratio is larger than the second threshold. In other words, the ECU 8 determines whether or not the plurality of $NO_x$ purification ratios determined in the processing of S302 include a $NO_x$ purification ratio that is larger than the second threshold. When an affirmative determination is obtained in the processing of S304, the ECU 8 advances to processing of S305 and determines in S305 that the $NO_x$ purification ability of the SCR catalyst is not completely lost (a normal determination). When a negative determination is obtained in the processing of S304, on the other hand, the ECU 8 advances to processing of S306 and determines in S306 that the $NO_x$ purification ability of the SCR catalyst is completely lost (a complete breakdown determination).

Diagnosing unit according to the present invention is realized by having the ECU 8 execute the processing routines of FIGS. 6 and 7 in this manner. As a result, a misdiagnosis of an abnormality in the SCR catalyst even though the SCR catalyst is normal can be suppressed even when the abnormality diagnosis processing is executed in a condition where the actual $NH_3$ adsorption amount is smaller than the estimated $NH_3$ adsorption amount, and more particularly a condition where the actual $NH_3$ adsorption amount is smaller than the predetermined amount.

Figure 9:
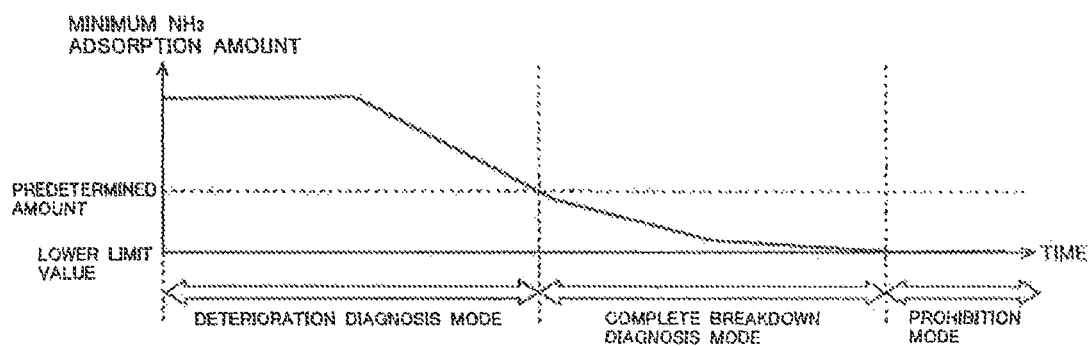
FIG. 9 is a view showing a relationship between the minimum $NH_3$ adsorption amount and the diagnosis mode.

As shown in FIG. 9, when the minimum $NH_3$ adsorption amount equals or exceeds the predetermined amount, the abnormality diagnosis processing may be executed in the deterioration diagnosis mode, and when the minimum $NH_3$ adsorption amount is smaller than the predetermined amount but larger than a lower limit value, the abnormality diagnosis processing may be executed in the complete breakdown diagnosis mode. Further, when the minimum $NH_3$ adsorption amount is equal to or smaller than the lower limit value, the abnormality diagnosis processing may be prohibited (a prohibition mode). Here, the lower limit value is an $NH_3$ adsorption amount (zero, for example) set such that when the minimum $NH_3$ adsorption amount is equal to or smaller than the lower limit value, the $NO_x$ purification ratio may fall to or below the second threshold even though the SCR catalyst is normal.

When the minimum $NH_3$ adsorption amount falls to zero, the actual $NH_3$ adsorption amount may also fall to zero. When the actual $NH_3$ adsorption amount falls to zero, the $NO_x$ purification ratio falls to or below the second threshold even though the $NO_x$ purification ability of the SCR catalyst is not completely lost. Therefore, when the abnormality diagnosis processing is executed while the minimum $NH_3$ adsorption amount is equal to or smaller than the lower limit value, the $NO_x$ purification ability of the SCR catalyst may be misdiagnosed as being completely lost despite not being completely lost.

Figure 10:
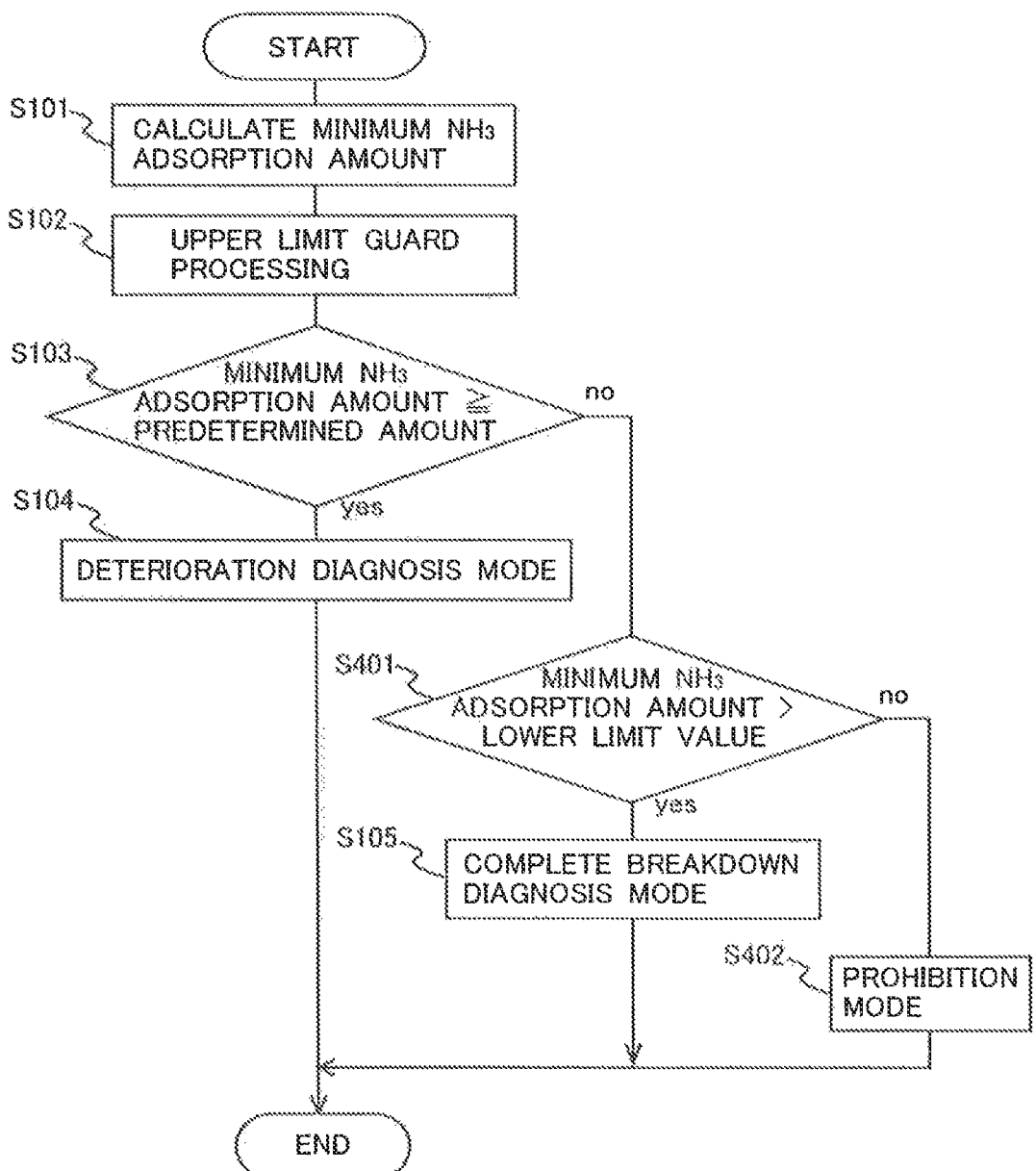
FIG. 10 is a flowchart showing another example of the processing routine executed by the ECU to switch the diagnosis mode in accordance with the minimum $NH_3$ adsorption amount.

On the other hand, by prohibiting execution of the abnormality diagnosis processing when the minimum $NH_3$ adsorption amount is equal to or smaller than the lower limit value, a misdiagnosis such as that described above is unlikely to occur. Accordingly, a misdiagnosis of an abnormality in the SCR catalyst when the SCR catalyst is normal can be suppressed more reliably. Procedures for switching the diagnosis mode when the diagnosis mode includes the prohibition mode will now be described using FIG. 10. In FIG. 10, identical processes to the processing routine shown in FIG. 5 have been allocated identical reference symbols.

In the processing routine of FIG. 10, when a negative determination is obtained in the processing of S103, the ECU 8 advances the processing to S401 in order to determine whether or not the minimum $NH_3$ adsorption amount is larger than the lower limit value. When an affirmative determination is obtained in the processing of S401, the ECU 8 advances the processing to S105. When a negative determination is obtained in the processing of S401, on the other hand, the ECU 8 advances to processing of S402 in order to select the mode (the prohibition mode) in which execution of the abnormality diagnosis processing is prohibited. When the prohibition mode is selected, the ECU 8 does not execute the abnormality diagnosis processing, and therefore a misdiagnosis of complete loss of the $NO_x$ purification ability of the SCR catalyst even though the $NO_x$ purification ability is not completely lost can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-107402, filed on May 23, 2014, which is hereby incorporated by reference herein in its entirety.

What is claimed is:

1. An abnormality diagnosis apparatus for an exhaust gas purification apparatus, comprising:
    an exhaust gas purification apparatus disposed in an exhaust passage of an internal combustion engine and having a selective catalytic reduction catalyst;
    an addition device that adds an additive constituted by ammonia or an ammonia precursor to exhaust gas flowing into said exhaust gas purification apparatus; and
    an electronic control unit (ECU) comprising:
    estimating unit for estimating a NO inflow amount, which is an amount of NO flowing into said exhaust gas purification apparatus, using a parameter indicating an operating condition of said internal combustion engine;
    first obtaining unit for obtaining an $NH_3$ adsorption amount, which is an amount of ammonia adsorbed to said exhaust gas purification apparatus, using said NO inflow amount estimated by said estimating unit as a parameter;
    control unit for controlling an amount of said additive added by said addition device, using said $NH_3$ adsorption amount obtained by said first obtaining unit as a parameter;
    diagnosing unit for determining whether or not an abnormality exists in said exhaust gas purification apparatus by calculating a physical quantity that correlates with a NO purification ability of said exhaust gas purification apparatus, using said NO inflow amount estimated by said estimating unit as a parameter, and comparing a calculation result with a predetermined threshold; and second obtaining unit for obtaining a minimum $NH_3$ adsorption amount, which is an $NH_3$ adsorption amount of said exhaust gas purification apparatus obtained on the supposition that said exhaust gas purification apparatus is normal and that an amount of NO discharged from said internal combustion engine reaches a maximum under an identical operating condition to said operating condition of said internal combustion engine in which said NO inflow amount is estimated by said estimating unit, wherein said diagnosing unit determines whether or not said NO purification ability of said exhaust gas purification apparatus has deteriorated from a normal condition by comparing said physical quantity with a first threshold when said minimum $NH_3$ adsorption amount equals or exceeds a predetermined amount, and determines whether or not said NO purification ability of said exhaust gas purification apparatus has been completely lost by comparing said physical quantity with a second threshold that is smaller than said first threshold when said minimum $NH_3$ adsorption amount is smaller than said predetermined amount.

2. The abnormality diagnosis apparatus for an exhaust gas purification apparatus according to claim 1, wherein said diagnosing unit does not perform a diagnosis when said minimum $NH_3$ adsorption amount is equal to or smaller than a lower limit value that is smaller than said predetermined amount.

3. The abnormality diagnosis apparatus for an exhaust gas purification apparatus according to claim 1, wherein
in a case where said minimum $NH_3$ adsorption amount equals or exceeds said predetermined amount, said diagnosing unit calculates said physical quantity a plurality of times at different timings, determines that said $NO_x$ purification ability of said exhaust gas purification apparatus has not deteriorated from said normal condition when an average value of a plurality of calculation results is larger than said first threshold, and determines that said $NO_x$ purification ability of said exhaust gas purification apparatus has deteriorated from said normal condition when said average value of said plurality of calculation results is equal to or smaller than said first threshold, and in a case where said minimum $NH_3$ adsorption amount is smaller than said predetermined amount, said diagnosing unit calculates said physical quantity a plurality of times at different timings, determines that said $NO_x$ purification ability of said exhaust gas purification apparatus is completely lost when all of a plurality of calculation results are equal to or smaller than said second threshold, and determines that said $NO_x$ purification ability of said exhaust gas purification apparatus is not completely lost when at least one of said plurality of calculation results is larger than said second threshold.

4. The abnormality diagnosis apparatus for an exhaust gas purification apparatus according to claim 2, wherein
in a case where said minimum $NH_3$ adsorption amount equals or exceeds said predetermined amount, said diagnosing unit calculates said physical quantity a plurality of times at different timings, determines that said $NO_x$ purification ability of said exhaust gas purification apparatus has not deteriorated from said normal condition when an average value of a plurality of calculation results is larger than said first threshold, and determines that said $NO_x$ purification ability of said exhaust gas purification apparatus has deteriorated from said normal condition when said average value of said plurality of calculation results is equal to or smaller than said first threshold, and in a case where said minimum $NH_3$ adsorption amount is smaller than said predetermined amount, said diagnosing unit calculates said physical quantity a plurality of times at different timings, determines that said $NO_x$ purification ability of said exhaust gas purification apparatus is completely lost when all of a plurality of calculation results are equal to or smaller than said second threshold, and determines that said $NO_x$ purification ability of said exhaust gas purification apparatus is not completely lost when at least one of said plurality of calculation results is larger than said second threshold.

* * * * *